US011184952B2

United States Patent
Sengupta et al.

(10) Patent No.: US 11,184,952 B2
(45) Date of Patent: Nov. 23, 2021

(54) LENGTH-SIX COMPUTER GENERATED SEQUENCES (CGS) FOR UPLINK LOW PEAK-TO-AVERAGE POWER RATIO (PAPR) DEMODULATION REFERENCE SIGNALS (DMRS)

(71) Applicant: Intel Corporation, Santa Clara, CA (US)

(72) Inventors: Avik Sengupta, San Jose, CA (US); Alexei Vladimirovich Davydov, Nizhny Novgorod (RU); Sameer Pawar, Santa Clara, CA (US); Gregory Vladimirovich Morozov, Nizhny Novgorod (RU); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/815,374

(22) Filed: Mar. 11, 2020

(65) Prior Publication Data

US 2020/0214083 A1   Jul. 2, 2020

Related U.S. Application Data

(60) Provisional application No. 62/829,536, filed on Apr. 4, 2019, provisional application No. 62/828,288, filed on Apr. 2, 2019.

(51) Int. Cl.
  *H04W 88/06* (2009.01)
  *H04L 5/10* (2006.01)
  (Continued)

(52) U.S. Cl.
  CPC ......... *H04W 88/06* (2013.01); *H04J 13/0029* (2013.01); *H04L 5/0055* (2013.01);
  (Continued)

(58) Field of Classification Search
  None
  See application file for complete search history.

(56) References Cited

U.S. PATENT DOCUMENTS

2019/0081838 A1* 3/2019 Qu ..................... H04L 27/2636
2019/0149298 A1* 5/2019 Yang ................... H04J 13/0022
  370/336
(Continued)

FOREIGN PATENT DOCUMENTS

EP    3726771 A1 * 10/2020  ............... H04L 5/02

OTHER PUBLICATIONS

"3GPP TS 38.211 v15.1.0, NR Physical Channels and Modulation (Release 15)", Technical Specification. 3GPP Organizational Partners., (2018), 102 pgs.
(Continued)

*Primary Examiner* — Otis L Thompson, Jr.
(74) *Attorney, Agent, or Firm* — Schwegman Lundberg & Woessner, P.A.

(57) ABSTRACT

An apparatus of user equipment (UE) includes processing circuitry coupled to a memory, where to configure the UE for DMRS processing in an NR network, the processing circuitry is to decode higher layer signaling, the higher layer signaling to indicate whether transform precoding is enabled and to indicate a modulation scheme for a physical uplink shared channel (PUSCH) if transform precoding is enabled. A set of low Peak-to-Average-Power-Ratio (PAPR) base sequences of length-6 is generated. A reference signal sequence is generated as a demodulation reference signal (DMRS) using the set of low-PAPR base sequences, based on the modulation scheme if transform precoding is enabled by the higher layer signaling, the modulation scheme being a $\pi/2$-binary phase-shift keying (BPSK) modulation scheme. Mapping of the DMRS to physical resources for transmission using the PUSCH is performed.

20 Claims, 7 Drawing Sheets

(51) Int. Cl.
*H04J 13/00* (2011.01)
*H04W 80/08* (2009.01)
*H04L 27/26* (2006.01)
*H04L 5/00* (2006.01)

(52) U.S. Cl.
CPC ............ *H04L 5/10* (2013.01); *H04L 27/2614* (2013.01); *H04W 80/08* (2013.01)

(56) References Cited

U.S. PATENT DOCUMENTS

2020/0145266 A1* 5/2020 Yang .................... H04J 13/0055
2020/0266947 A1* 8/2020 Noh ....................... H04L 5/0051
2020/0287762 A1* 9/2020 Qu ....................... H04L 27/2614

OTHER PUBLICATIONS

"Benefits of Resource Specific DMRS mapping", Ericsson. R1-1806231,3GPP RAN WG1 Meeting #93, (2018), 4 pgs.
"Study on the maximum number of MIMO layers for MU-MIMO", Intel Corporation, R1-1702190, , 3GPP TSG RAN1 Meeting #88, (2017), 4 pgs.
"3GPP TS 38.212 v15.1.0, NR Multiplexing and Channel Coding (Release 15)", Technical Specification. 3GPP Organizational Partners, (2018), 94 pgs.
"3GPP TS 38.214 v15.1.0, NR Physical Layer Procedures for Data (Release 15)", Technical Specification. 3GPP Organizational Partners., (2018), 77 pgs.
"Indian Application Serial No. 202044013668, Voluntary Amendment filed Jan. 19, 2021", 17 pgs.

* cited by examiner

LENGTH-SIX COMPUTER GENERATED SEQUENCES (CGS) FOR UPLINK LOW PEAK-TO-AVERAGE POWER RATIO (PAPR) DEMODULATION REFERENCE SIGNALS (DMRS)

PRIORITY CLAIM

This application claims the benefit of priority to the following United States Provisional Patent Applications:

U.S. Provisional Patent Application Ser. No. 62/828,288, filed Apr. 2, 2019, and entitled "LENGTH-SIX COMPUTER GENERATED SEQUENCES (CGS) FOR UPLINK LOW PEAK-TO-AVERAGE POWER RATIO (PAPR) DEMODULATION REFERENCE SIGNALS (DMRS);" and U.S. Provisional Patent Application Ser. No. 62/829,536, filed Apr. 4, 2019, and entitled "LENGTH-SIX COMPUTER GENERATED SEQUENCES (CGS) FOR UPLINK LOW PEAK-TO-AVERAGE POWER RATIO (PAPR) DEMODULATION REFERENCE SIGNALS (DMRS)."

Each of the above-listed applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to techniques for low uplink peak-to-average-power-ratio (PAPR) demodulation reference signal (DMRS) sequence design, including using length-6 sequences for uplink low-PAPR DMRS sequence design.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include the design and configuration of uplink low-PAPR DMRS sequences.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
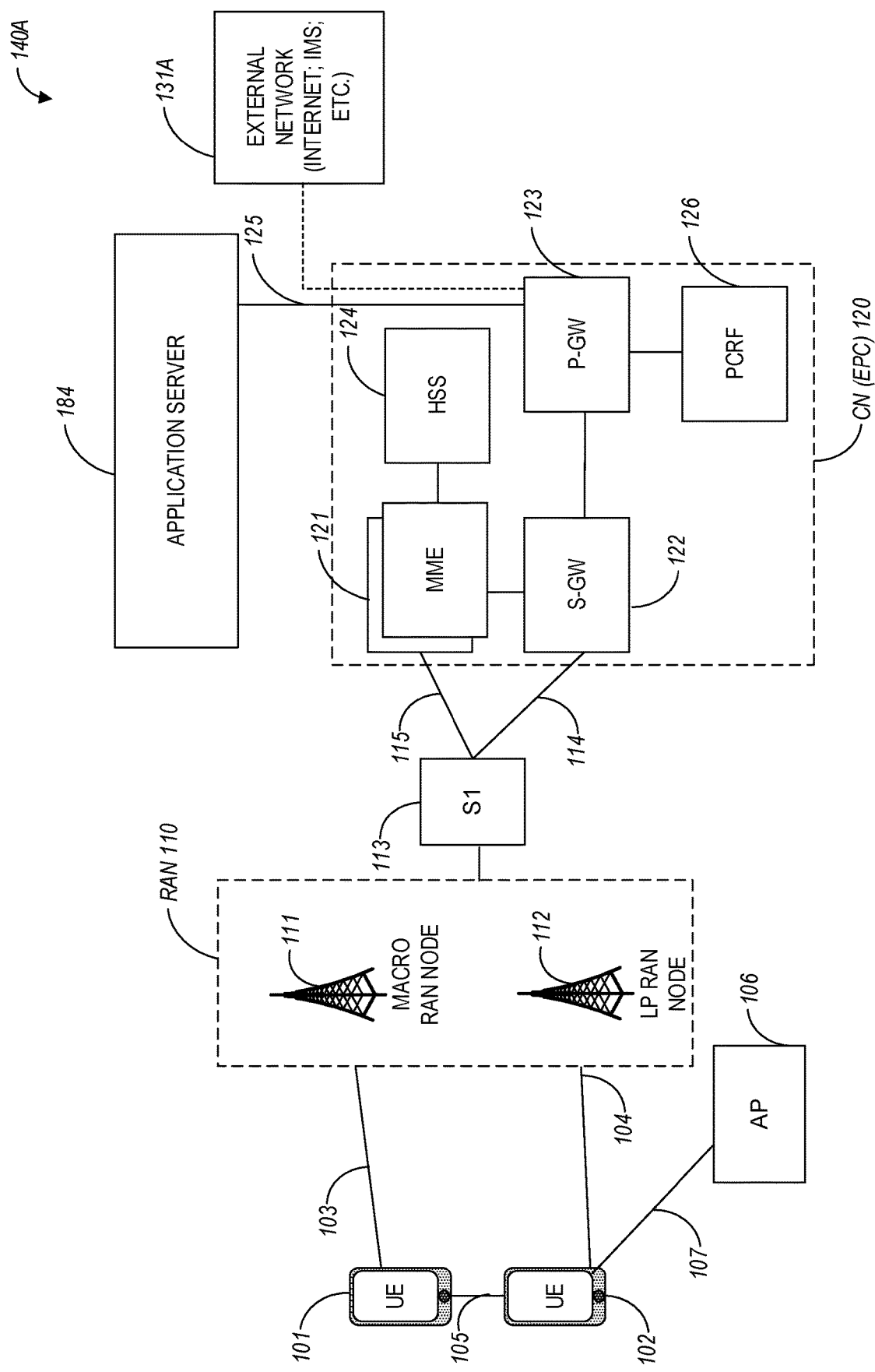
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN. In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
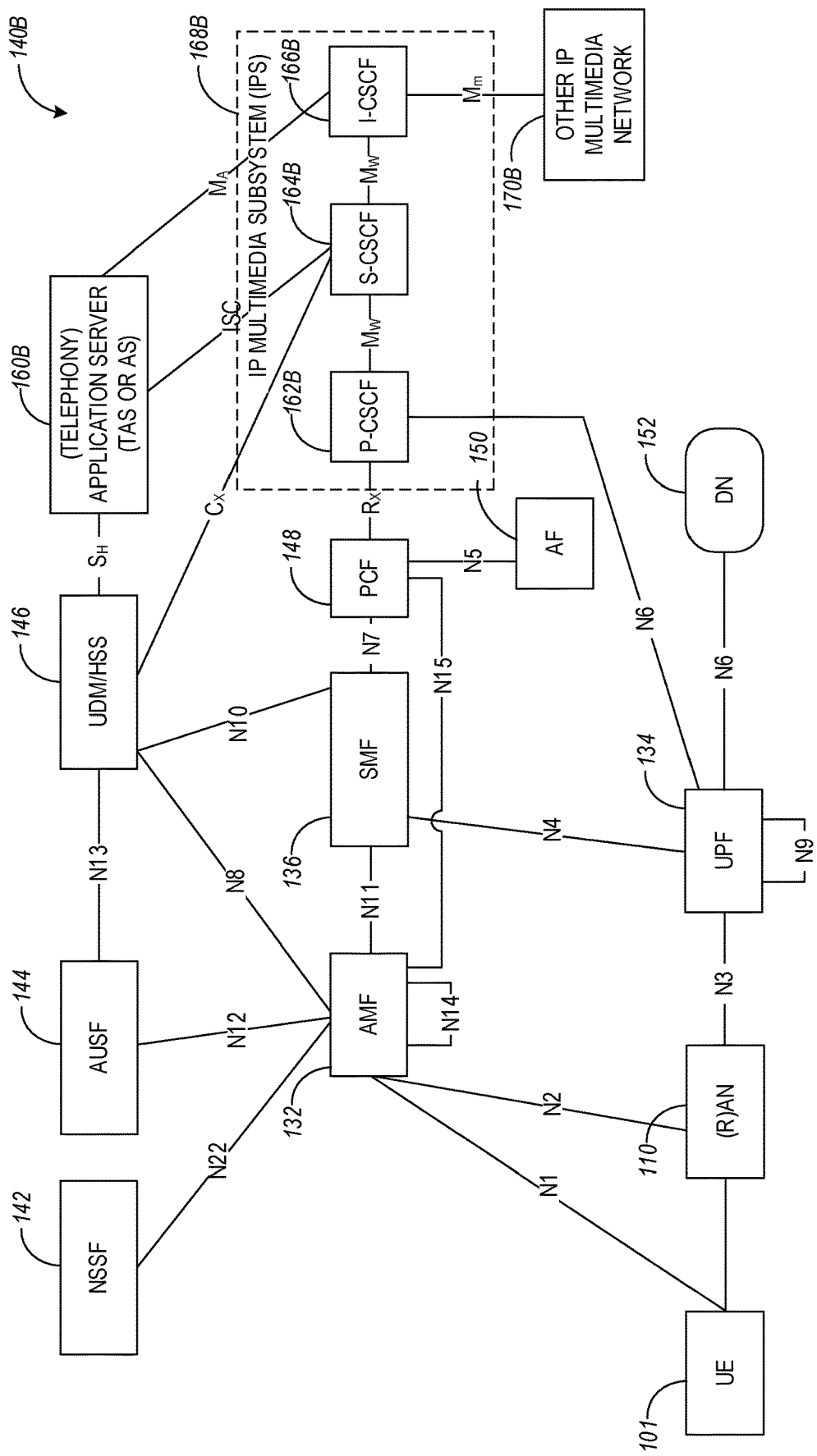
FIG. 1B and FIG. 1C illustrate a non-roaming 5G system architecture, in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
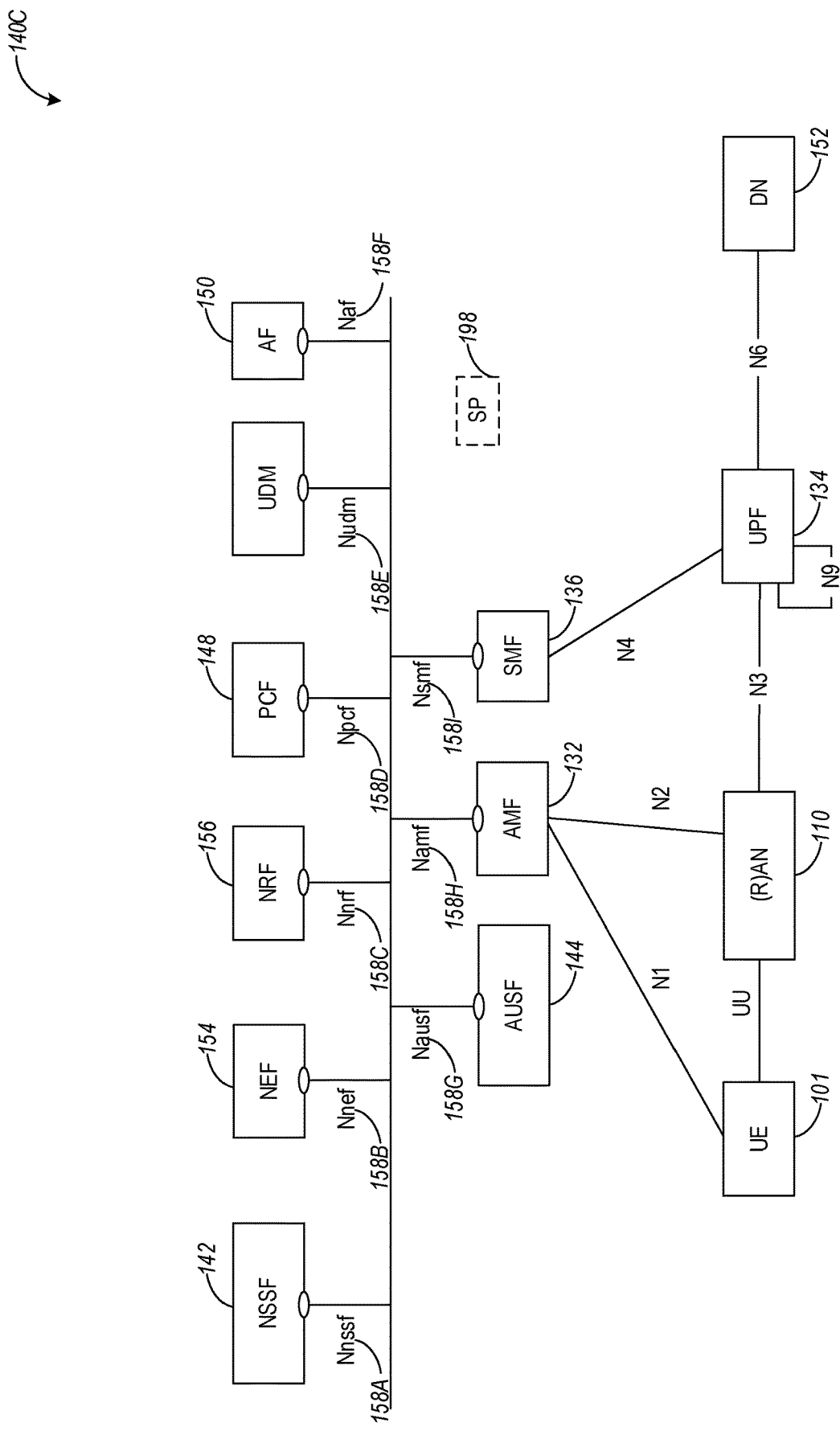

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points N1 or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

Techniques discussed herein are associated with 3 GPP NR Rel-16 and NR MIMO low PAPR reference signal design. For PUSCH/PUCCH DMRS for pi/2 modulation, new DMRS sequences may be specified to reduce the PAPR to the same level as for data symbols. In some aspects, for length-6 computer-generated sequences (CGS), 8-PSK may be used.

In Rel-15 NR, for the case of pi/2 BPSK modulated DFT-S-OFDM based PUSCH/PUCCH, the corresponding demodulation reference signals (DMRSs) may be generated in the frequency domain based on computer-generated sequences (CGS) mapped to QPSK constellation for the case of resource allocation of up to 3 physical resource blocks (PRBs) or based on extended Zadoff-Chu sequences for larger resource allocations. For the case when pi/2 BPSK modulation is used for data, the PAPR of the DMRS is degraded compared to the data especially when pulse shaping is used.

Techniques discussed herein can be used for low PAPR reference signal design for DFT-S-OFDM based PUSCH/PUCCH with pi/2-BPSK modulation for large and small resource allocation.

Figure 2:
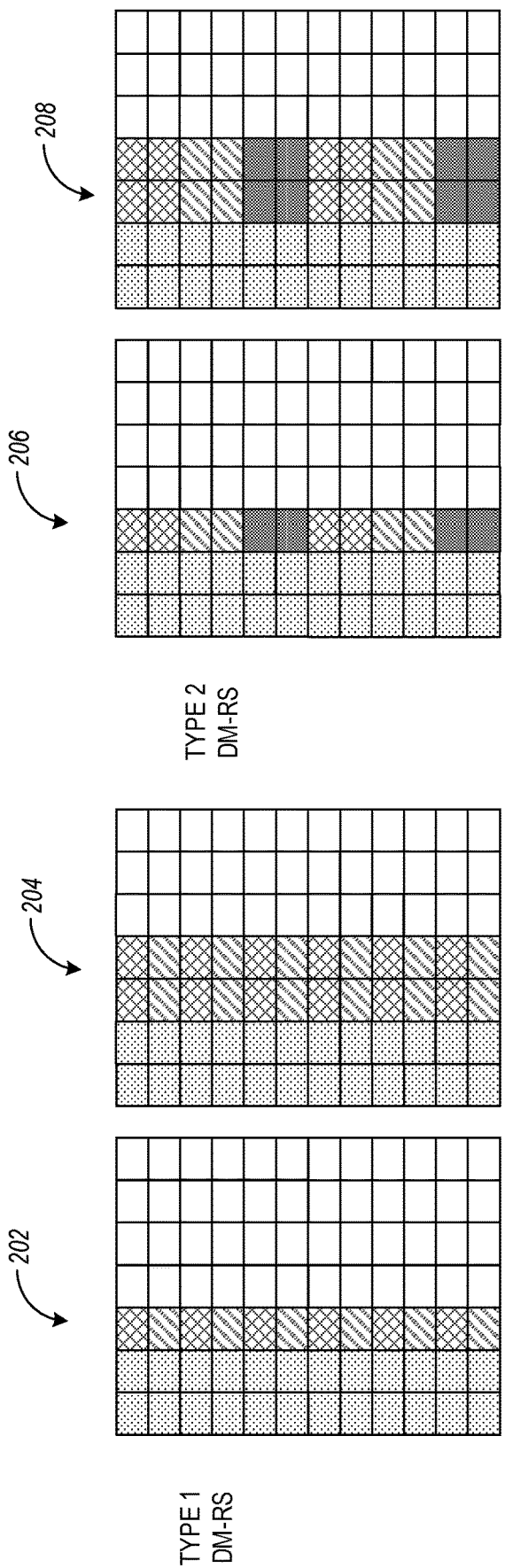
FIG. 2 illustrates example type I and type II DMRS, in accordance with some aspects.

FIG. 2 illustrates example type I and type II DMRS, in accordance with some aspects. In NR Rel-15, two different DMRS types were designed namely Type-1 DMRS (202 and 204) and Type-2 DMRS (206 and 208) which are shown in FIG. 2.

For the single symbol case, Type 1 DMRS uses a comb-2 structure with 2 CDM-Groups and length-2 FD-OCC per pair of alternating REs in each CDM-Group, while Type 2 DMRS uses a comb-3 structure with 3 CDM-Groups and length-2 FD-OCC per pair of adjacent REs in each CDM-Group. The length-2 FD-OCC is given by [1 1, 1 −1].

In some aspects, for uplink (UL) DMRS, when the DFT-S-OFDM waveform is used, only Type 1 DMRS is used in Rel-15 NR. For base sequences of length-6, computer generated sequences mapped to a QPSK constellation may be used. The DMRS sequences are generated in the frequency domain i.e., they are not DFT-spread and are constant modulus signals in the frequency domain. In the case when pi/2-BPSK is used for modulating the PUSCH/PUCCH, the PAPR of the data becomes much lower than of the ZC or CGS based DMRS. In this IDF, we propose length-6 sequence design for the case of PUSCH/PUCCH when pi/2 BPSK modulation and DFT-s-OFDM waveform is used.

The mapping of the binary sequence b(i) to pi/2 BPSK sequence d(i) is defined according to the following equation:

$$d(i) = \frac{e^{j\frac{\pi}{2}(i \bmod 2)}}{\sqrt{2}}[(1-2b(i)) + j(1-2b(i))]$$

After DFT-spreading of the pi/2-BPSK modulated DMRS sequence, frequency domain pulse/spectrum shaping can be applied.

Length-6 CGS Design

In some aspects, length-6 CGS sequences for 1 PRB allocation are generated from an 8-PSK constellation in the time domain, DFT-Spread and mapped to the frequency domain resources using Type 1 DMRS mapping. In this case, the chosen sequences provide low PAPR for both comb 0 and comb 1 i.e., when mapped to even or odd subcarriers. The two DM-RS ports in comb 0 and 1 are generated as listed in TABLE 1 below:

TABLE 1

| DM-RS Port Number | CDM Group | DM-RS Sequence in Time domain |
|---|---|---|
| 0 | 0 | $r = \{r_u(n)\}$, n = 0, 1, 2, ..., N − 1<br>$R = \{R(m)\} = DFT([r\ r])$; m = 0, 1, 2, ..., 2N − 1 |
| 2 | 1 | $r = (r_u(n))$; n = 0, 1, 2, ..., N − 1<br>$R = \{R(m)\} = DFT([r\ r] \times diag[e^{j\pi m/N}])$;<br>m = 0, 1, 2, ..., 2N − 1 |

In some aspects, the final set of 30 sequences is chosen such that the cross-correlation is minimized between the chosen set of 30 sequences, where the cross-correlation is measured after application of a frequency domain pulse shaping filter before transmission. An example of such a length-6 CGS design with pulse shaping filter having time domain coefficients [0.28 1 0.28] is given by the following equation:

$$r_u(n) = e^{\frac{j\pi\phi(n)}{8}};$$
$$n = 0, \ldots, 5,$$

Where the phase values are given in the following TABLE 2 (Length-6 Time Domain 8-PSK CGS Sequences with Cross-Correlation measured after Pulse Shaping with filter [0.28 1 0.28]):

TABLE 2

| u | φ(0), . . . , φ(5) | Port 0 PAPR | Port 2 PAPR | Auto-Correlation Lags −2 to 2 | |
|---|---|---|---|---|---|
| | | | | Mean | Max |
| 0 | −7 −3 −7 5 −7 −3 | 1.4590 | 2.1339 | 0.1863 | 0.3333 |
| 1 | −7 −3 1 −5 −5 5 | 1.6518 | 1.5602 | | |
| 2 | −3 1 1 5 −1 −7 | 1.9575 | 1.3814 | | |
| 3 | 5 −1 −7 −1 1 7 | 1.8227 | 1.9035 | | |
| 4 | 5 −7 −3 7 −5 7 | 1.7194 | 2.0794 | | |
| 5 | −1 −5 −1 3 1 −5 | 1.3980 | 1.8632 | | |
| 6 | −7 −3 −7 −3 7 −5 | 1.7101 | 1.9336 | | |
| 7 | −7 3 1 7 −7 −1 | 1.7955 | 1.8690 | | |
| 8 | −7 −3 1 7 3 −3 | 1.2353 | 1.8822 | | |
| 9 | −7 −3 −7 5 −1 5 | 1.9850 | 1.6231 | | |
| 10 | −7 −3 −7 −3 1 −5 | 1.5686 | 2.1440 | | |
| 11 | −7 −5 5 3 7 −1 | 2.1986 | 2.1699 | | |
| 12 | −3 7 −5 −1 −5 −1 | 1.5625 | 2.0833 | | |
| 13 | 5 7 −3 −5 5 −5 | 2.1572 | 2.0922 | | |
| 14 | 3 −1 −3 −5 −1 | 1.4519 | 1.8023 | | |
| 15 | −7 3 5 −1 3 5 | 1.7403 | 1.2073 | | |
| 16 | −7 3 1 5 −1 3 | 1.8189 | 1.8241 | | |
| 17 | −7 5 −3 1 −1 3 | 1.5922 | 1.7599 | | |
| 18 | −7 −7 3 5 1 5 | 1.9485 | 2.0536 | | |
| 19 | −7 −3 3 −1 3 −5 | 1.8685 | 2.1465 | | |
| 20 | −7 −5 −7 3 −7 −1 | 1.9287 | 2.1932 | | |
| 21 | 1 −3 1 −5 −1 3 | 1.5774 | 1.8360 | | |
| 22 | 1 5 1 5 3 7 | 1.6842 | 1.9050 | | |
| 23 | 1 5 3 7 −3 −7 | 1.5679 | 1.9419 | | |
| 24 | 1 −1 −5 −1 3 −3 | 1.7193 | 2.0490 | | |
| 25 | 1 −1 3 −1 −7 −3 | 1.8506 | 2.0336 | | |
| 26 | 1 −1 −7 5 −7 −3 | 1.9757 | 2.0125 | | |
| 27 | −5 3 7 5 3 7 | 1.9308 | 1.9670 | | |
| 28 | −7 3 −7 −5 1 −5 | 1.8131 | 1.8713 | | |
| 29 | −7 −7 −1 1 −5 1 | 1.9335 | 1.7211 | | |

Figure 3:
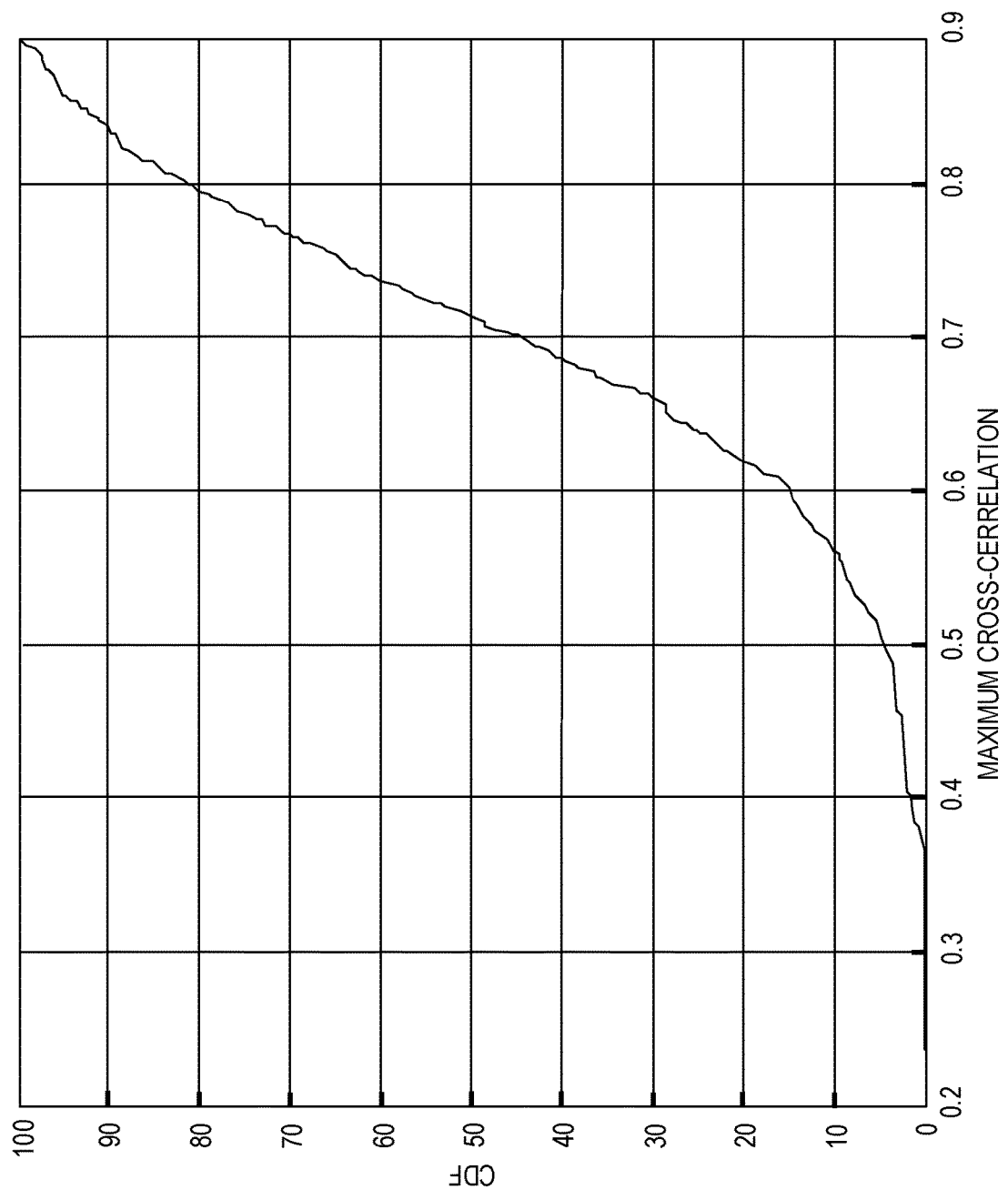
FIG. 3 is a graphical representation of a cumulative distribution function (CDF) of maximum pairwise cross-correlation with 8× oversampling for low-PAPR sequences across both port 0 and port 2 with an application of a frequency domain pulse shaping filter, in accordance with some aspects.

FIG. 3 is a graphical representation 300 of a cumulative distribution function (CDF) of maximum pairwise cross-correlation with 8× oversampling for low-PAPR sequences (e.g., as provided by TABLE 2) across both port 0 and port 2 with an application of a frequency domain pulse shaping filter, in accordance with some aspects.

In some aspects, the final set of 30 sequences is chosen such that the cross-correlation is minimized between the chosen set of 30 sequences, wherein the cross-correlation is measured without application of a frequency domain pulse shaping filter before transmission. An example of such a length-6 CGS design without a pulse shaping filter is given by the following equation:

$$r_u(n) = e^{\frac{j\pi\phi(n)}{8}};$$

$$n = 0, \ldots, 5,$$

Where the phase values are given in the following TABLE 3 (Length-6 Time Domain 8-PSK CGS Sequences with Cross-Correlation measured Without Pulse Shaping):

TABLE 3

| u | φ(0), . . . , φ(5) | Port 0 PAPR | Port 2 PAPR | Auto-Correlation Lags −2 to 2 | |
|---|---|---|---|---|---|
| | | | | Mean | Max |
| 0 | −7 −3 −7 5 −7 −3 | 1.4590 | 2.1339 | 0.1920 | 0.3333 |
| 1 | 7 5 −1 −7 −3 1 | 1.6768 | 1.7573 | | |

TABLE 3-continued

| u | φ(0), . . . , φ(5) | Port 0 PAPR | Port 2 PAPR | Auto-Correlation Lags −2 to 2 | |
|---|---|---|---|---|---|
| | | | | Mean | Max |
| 2 | 3 −3 1 5 −1 −1 | 1.8115 | 1.8095 | | |
| 3 | −1 −7 −3 −5 −1 3 | 1.4325 | 1.9940 | | |
| 4 | −1 3 7 −3 7 3 | 2.1216 | 1.9257 | | |
| 5 | −1 3 1 5 −1 −5 | 1.4389 | 2.1721 | | |
| 6 | −7 −3 −7 −3 7 −5 | 1.7101 | 1.9336 | | |
| 7 | −7 −3 1 −5 −1 −5 | 1.7194 | 2.0794 | | |
| 8 | −7 −3 3 −3 −7 −3 | 1.5071 | 1.8377 | | |
| 9 | −7 −7 −1 1 −5 1 | 1.9335 | 1.7211 | | |
| 10 | −7 −3 −7 5 −1 5 | 1.9850 | 1.6231 | | |
| 11 | −7 −7 −3 1 5 −1 | 2.1848 | 1.2848 | | |
| 12 | 5 7 −3 −5 5 −5 | 2.1572 | 2.0922 | | |
| 13 | −3 7 −5 −1 −5 −1 | 1.5625 | 2.0833 | | |
| 14 | 5 −7 7 1 5 1 | 1.5052 | 1.9961 | | |
| 15 | −7 3 1 5 −1 3 | 1.8189 | 1.8241 | | |
| 16 | −7 −5 −1 −7 −5 5 | 1.4995 | 1.1104 | | |
| 17 | −7 1 −3 3 7 5 | 1.7833 | 2.0652 | | |
| 18 | −7 −7 3 5 1 5 | 1.9485 | 2.0536 | | |
| 19 | −7 −3 3 −1 3 −5 | 1.8685 | 2.1465 | | |
| 20 | −7 −5 5 3 −7 −1 | 1.6192 | 2.1360 | | |
| 21 | 1 5 1 5 3 7 | 1.6842 | 1.9050 | | |
| 22 | 1 −3 1 −5 −1 3 | 1.5774 | 1.8360 | | |
| 23 | 1 7 1 −5 −7 −1 | 1.8286 | 1.8903 | | |
| 24 | 1 −1 3 −1 −7 −3 | 1.8506 | 2.0336 | | |
| 25 | 1 −1 −5 −1 3 −3 | 1.7193 | 2.0490 | | |
| 26 | 1 −1 3 −1 3 7 | 1.5971 | 2.0380 | | |
| 27 | −5 3 7 5 3 7 | 1.9308 | 1.9670 | | |
| 28 | −7 1 −3 1 5 1 | 1.9432 | 1.9263 | | |
| 29 | 1 5 3 −7 5 −3 | 2.0832 | 1.8265 | | |

Figure 4:
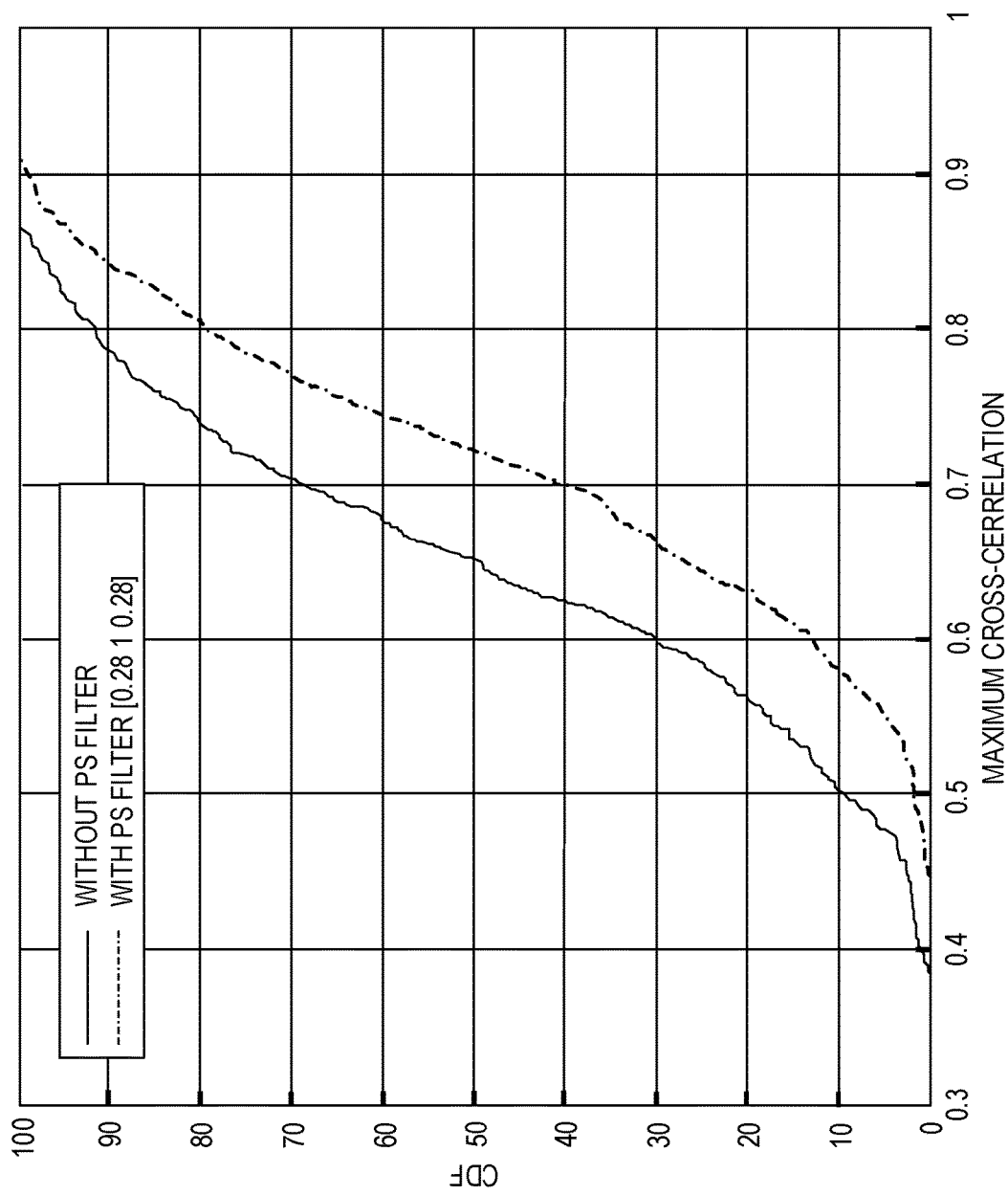
FIG. 4 is a graphical representation of a cumulative distribution function (CDF) of maximum pairwise cross-correlation with 8× oversampling for low-PAPR sequences without an application of a frequency domain pulse shaping filter, in accordance with some aspects.

FIG. 4 is a graphical representation 400 of a cumulative distribution function (CDF) of maximum pairwise cross-correlation with 8× oversampling for low-PAPR sequences (e.g., as provided by TABLE 4) without an application of a frequency domain pulse shaping filter, in accordance with some aspects.

Complementary Length-6 CGS Design

In some aspects, for the case of CGS sequences of length-6, a set of complementary sequences may be chosen from the set of sequences in Tables 2 and 3. For each sequence, a corresponding sequence is selected from the same set such that the frequency domain spectral flatness or equivalently the joint autocorrelation of the two sequences improves compared to individual sequences when used in adjacent DMRS symbols or adjacent occurring DMRS symbols in the time domain. In this case, this deterministic choice of sequences behaves similarly to a fixed group-hopping pattern. The following TABLES 4 and 5 provide an example of complementary sequences chosen from the set of 30 sequences for length-6 (e.g., as listed in Tables 2 and 3).

TABLE 4

Complementary CGS for Length-6 Based on Table 2

| CGS Index for First Symbol | Complementary CGS Index for adjacent DMRS Symbol |
|---|---|
| 0 | 26 |
| 1 | 25 |
| 2 | 27 |
| 3 | 18 |
| 4 | 0 |
| 5 | 9 |
| 6 | 29 |
| 7 | 5 |
| 8 | 4 |
| 9 | 14 |

TABLE 4-continued

Complementary CGS for Length-6 Based on Table 2

| CGS Index for First Symbol | Complementary CGS Index for adjacent DMRS Symbol |
|---|---|
| 10 | 11 |
| 11 | 10 |
| 12 | 20 |
| 13 | 12 |
| 14 | 8 |
| 15 | 13 |
| 16 | 3 |
| 17 | 28 |
| 18 | 7 |
| 19 | 24 |
| 20 | 21 |
| 21 | 2 |
| 22 | 1 |
| 23 | 16 |
| 24 | 17 |
| 25 | 15 |
| 26 | 6 |
| 27 | 23 |
| 28 | 19 |
| 29 | 22 |

TABLE 4

Complementary CGS for Length-6 Based on Table 3

| CGS Index for First Symbol | Complementary CGS Index for adjacent DMRS Symbol |
|---|---|
| 0 | 8 |
| 1 | 18 |
| 2 | 3 |
| 3 | 25 |
| 4 | 14 |
| 5 | 4 |
| 6 | 0 |
| 7 | 24 |
| 8 | 6 |
| 9 | 5 |
| 10 | 13 |
| 11 | 7 |
| 12 | 26 |
| 13 | 20 |
| 14 | 10 |
| 15 | 11 |
| 16 | 1 |
| 17 | 2 |
| 18 | 12 |
| 19 | 29 |
| 20 | 22 |
| 21 | 9 |
| 22 | 23 |
| 23 | 15 |
| 24 | 16 |
| 25 | 17 |
| 26 | 27 |
| 27 | 28 |
| 28 | 19 |
| 29 | 21 |

Figure 5:
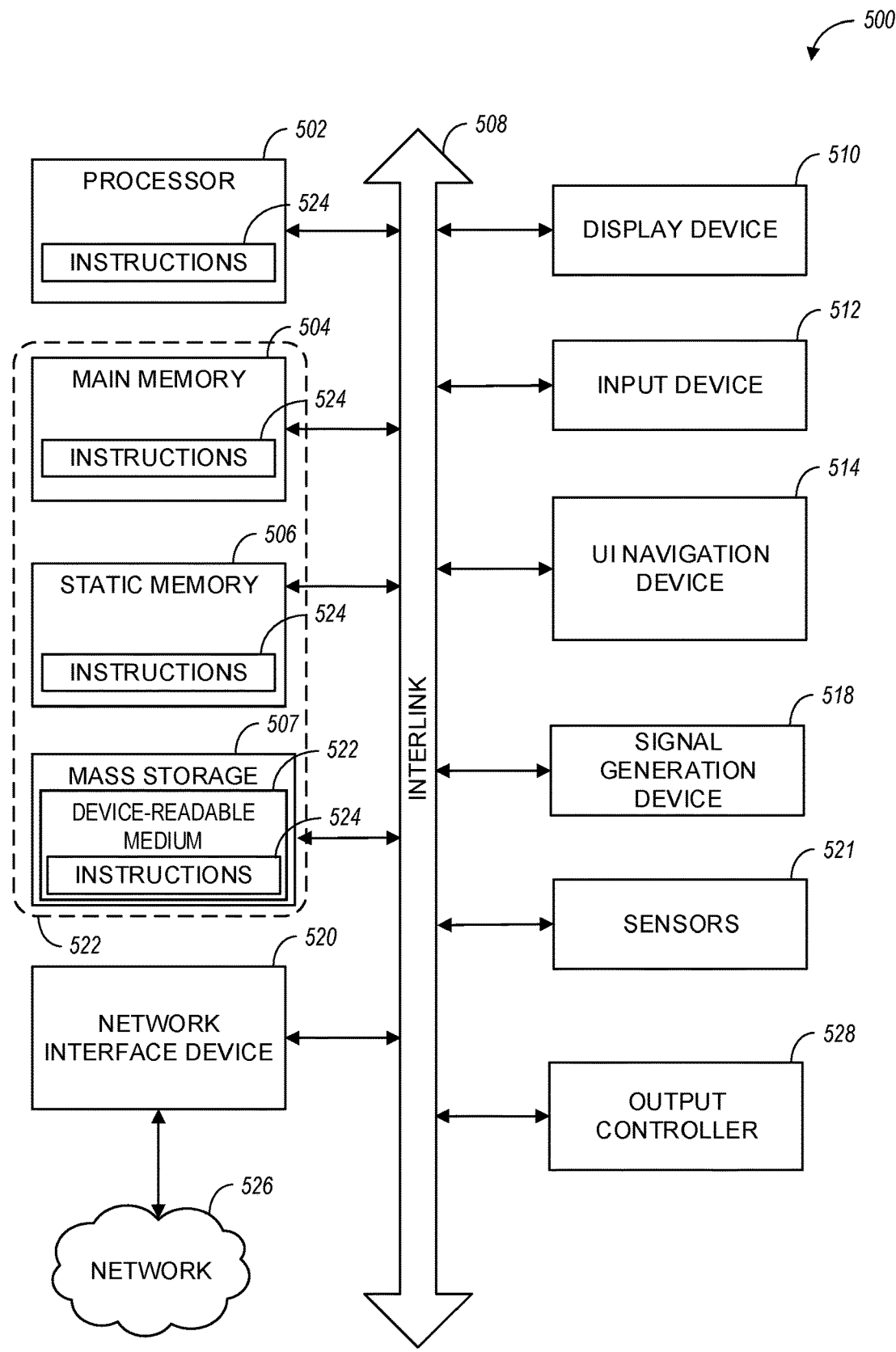
FIG. 5 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 5 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 500 may operate as a standalone device or may be connected (e.g., networked) to other communication devices.

Circuitry (e.g., processing circuitry) is a collection of circuits implemented in tangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, the device 500 may operate as a standalone device or may be connected (e.g., networked) to other devices. In a networked deployment, the communication device 500 may operate in the capacity of a server communication device, a client communication device, or both in server-client network environments. In an example, the communication device 500 may act as a peer communication device in peer-to-peer (P2P) (or other distributed) network environment. The communication device 500 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 500 may include a hardware processor 502 (e.g., a central processing unit (CPU), a graphics processing unit (GPU), a hardware processor core, or any combination thereof), a main memory 504, a static memory 506, and mass storage 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touchscreen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the mass storage 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store the one or more instructions 524. The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding or carrying instructions for execution by the communication device 500, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in a user equipment (UE), the apparatus comprising:
   processing circuitry, wherein to configure the UE for demodulation reference signal (DMRS) generation in a New Radio (NR) network, the processing circuitry is to:
   decode higher layer signaling, the higher layer signaling to indicate whether transform precoding is enabled and to indicate a modulation scheme for a physical uplink shared channel (PUSCH) if transform precoding is enabled;
generate a set of low Peak-to-Average-Power-Ratio (PAPR) base sequences of length-6 using a length-6 sequence;
generate a DMRS using the set of low-PAPR base sequences of length-6, based on the modulation scheme if transform precoding is enabled by the higher layer signaling, the modulation scheme being a π/2-binary phase-shift keying (BPSK) modulation scheme;
map the DMRS to physical resources;
and
encode the DMRS for transmission with the PUSCH using the mapped physical resources; and
memory coupled to the processing circuitry and configured to store the DMRS.

2. The apparatus of claim 1, wherein the set of low-PAPR base sequences is generated based on a length-6 sequence of "−7 −3 −7 5 −7 −3".

3. The apparatus of claim 1, wherein the set of low-PAPR base sequences is generated based on a length-6 sequence of "−7 −3 −7 −3 7 −5".

4. The apparatus of claim 1, wherein the set of low-PAPR base sequences is generated based on a length-6 sequence of "−7 −3 −7 5 −1 5".

5. The apparatus of claim 1, wherein the set of low-PAPR base sequences is generated based on a length-6 sequence of "−7 −7 −3 1 5 −1".

6. The apparatus of claim 1, wherein the set of low-PAPR base sequences is generated based on a length-6 sequence of "5 7 −3 −5 5 −5".

7. The apparatus of claim 1, wherein the set of low-PAPR base sequences is generated based on a length-6 sequence of "−3 7 −5 −1 −5 −1".

8. The apparatus of claim 1, wherein the set of low-PAPR base sequences is generated based on a length-6 sequence of "5 −7 7 1 5 1".

9. The apparatus of claim 1, wherein the set of low-PAPR base sequences is generated based on a length-6 sequence of "−7 3 1 5 −1 3".

10. The apparatus of claim 1, wherein the set of low-PAPR base sequences is generated based on a length-6 sequence of "1 −1 −5 −1 3 −3".

11. The apparatus of claim 10, wherein the apparatus is a baseband processor used within the UE.

12. A non-transitory computer-readable storage medium that stores instructions for execution by one or more processors of a user equipment (UE), the instructions to configure the one or more processors for demodulation reference signal (DMRS) generation in a New Radio (NR) network and to cause the UE to:
decode higher layer signaling, the higher layer signaling to indicate whether transform preceding is enabled and to indicate a modulation scheme for a physical uplink shared channel (PUSCH) if transform precoding is enabled;
generate a set of low Peak-to-Average-Power-Ratio (PAPR) base sequences of length-6 using a length-6 sequence;
generate a DMRS using the set of low-PAPR base sequences of length-6, based on the modulation scheme if transform precoding is enabled by the higher layer signaling, the modulation scheme being a π/2-binary phase-shift keying (BPSK) modulation scheme;
map the DMRS to physical resources;
and
encode the DMRS for transmission with the PUSCH using the mapped physical resources.

13. The non-transitory computer-readable storage medium of claim 12, wherein the set of low-PAPR base sequences is generated based on a length-6 sequence of "−7 −3 −7 5 −7 −3".

14. The non-transitory computer-readable storage medium of claim 12, wherein the set of low-PAPR base sequences is generated based on a length-6 sequence of "−7 −3 −7 −3 7 −5".

15. The non-transitory computer-readable storage medium of claim 12, wherein the set of low-PAPR base sequences is generated based on a length-6 sequence of "−7−3 −7 5 −1 5".

16. The non-transitory computer-readable storage medium of claim 12, wherein the set of low-PAPR base sequences is generated based on a length-6 sequence of "−7 −7 −3 1 5 −1".

17. The non-transitory computer-readable storage medium of claim 12, wherein the set of low-PAPR base sequences is generated based on a length-6 sequence of "5 7 −3 −5 5 −5".

18. The non-transitory computer-readable storage medium of claim 12, wherein the set of low-PAPR base sequences is generated based on a length-6 sequence of "−3 7 −5 −1 −5 −1".

19. A non-transitory computer-readable storage medium that stores instructions for execution by one or more processors of a base station, the instructions to configure the one or more processors for demodulation reference signal (DMRS) processing in a New Radio (NR) network and to cause the base station to:
encode higher layer signaling, the higher layer signaling to indicate transform preceding is enabled and to indicate a π/2-binary phase-shift keying (BPSK) modulation scheme for a physical uplink shared channel (PUSCH); and
decode a DMRS received with uplink data via the PUSCH, the DMRS generated based on a set of low Peak-to-Average-Power-Ratio (PAPR) base sequences of length-6 corresponding to the π/2-BPSK modulation scheme.

20. The non-transitory computer-readable storage medium of claim 19, wherein the set of low-PAPR base sequences is generated based on a length-6 sequence of "−7 −7 −3 1 5 −1".

* * * * *

UNITED STATES PATENT AND TRADEMARK OFFICE
CERTIFICATE OF CORRECTION

PATENT NO. : 11,184,952 B2  
APPLICATION NO. : 16/815374  
DATED : November 23, 2021  
INVENTOR(S) : Sengupta et al.

Page 1 of 1

It is certified that error appears in the above-identified patent and that said Letters Patent is hereby corrected as shown below:

In the Claims

Column 15, Line 54, Claim 12, delete "preceding" and insert --precoding-- therefor Column 16, Line 23, Claim 15, delete ""-7-3 -7 5 -1 5"." and insert --"-7 -3 -7 5 -1 5".-- therefor Column 16, Line 43, Claim 19, delete "preceding" and insert --precoding-- therefor Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*